(12) United States Patent
Pierre et al.

(10) Patent No.: US 11,541,701 B2
(45) Date of Patent: Jan. 3, 2023

(54) AUTO-LOCATION USING TIRE MOUNTED SYSTEM

(71) Applicant: Melexis Technologies SA, Bevaix (CH)

(72) Inventors: Emeric Pierre, Bevaix (CH); Julien Canioncq, Bevaix (CH); Ivan Zagan, Tessenderlo (BE)

(73) Assignee: MELEXIS TECHNOLOGIES SA, Bevaix (CH)

( * ) Notice: Subject to any disclaimer, the term of this patent is extended or adjusted under 35 U.S.C. 154(b) by 307 days.

(21) Appl. No.: 16/881,808

(22) Filed: May 22, 2020

(65) Prior Publication Data

US 2020/0369100 A1 Nov. 26, 2020

(30) Foreign Application Priority Data

May 23, 2019 (EP) .................................... 19176319

(51) Int. Cl.
*B60C 23/04* (2006.01)
(52) U.S. Cl.
CPC ...... *B60C 23/0416* (2013.01); *B60C 23/0433* (2013.01); *B60C 23/0474* (2013.01); *B60C 23/0488* (2013.01)
(58) Field of Classification Search
None
See application file for complete search history.

(56) References Cited

U.S. PATENT DOCUMENTS

| | | | |
|---|---|---|---|
| 6,112,587 A | 9/2000 | Oldenettel | |
| 8,332,103 B2 | 12/2012 | Greer et al. | |
| 9,387,733 B2 | 7/2016 | Fink | |
| 10,052,921 B2 | 8/2018 | Bettecken et al. | |
| 10,214,060 B2 | 2/2019 | Okada et al. | |
| 2013/0257610 A1* | 10/2013 | Lee | B60C 23/04 340/442 |
| 2014/0172251 A1* | 6/2014 | Championnet | G01P 3/44 701/51 |
| 2017/0106706 A1 | 4/2017 | Bettecken et al. | |

(Continued)

FOREIGN PATENT DOCUMENTS

| | | |
|---|---|---|
| DE | 102014204862 A1 | 9/2015 |
| DE | 112016002494 T5 | 2/2018 |

(Continued)

OTHER PUBLICATIONS

Search Report from corresponding EP Application No. EP19176319, dated Oct. 22, 2019.

(Continued)

*Primary Examiner* — Thomas S Mccormack
(74) *Attorney, Agent, or Firm* — Workman Nydegger

(57) ABSTRACT

An auto-location system for auto-locating a wheel in a vehicle comprises: a sensor module which comprises a sensor adapted for sensing a physical property of the tire when mounted in a tire or on an inner surface of the tire of the wheel, an acquisition system adapted for determining when the part of the tire where the sensor is mounted hits the ground, and forms a contact patch with the ground, by analyzing data from the sensor, and a communication system adapted for transmitting a wireless message, in which a unique identifier is embedded, a transmit delay after the part of the tire where the sensor is mounted hits the ground.

13 Claims, 4 Drawing Sheets

(56) References Cited

U.S. PATENT DOCUMENTS

| | | |
|---|---|---|
| 2018/0134102 A1 | 5/2018 | Okada et al. |
| 2018/0244116 A1* | 8/2018 | Zhuk .................. B60C 23/0416 |
| 2020/0300885 A1* | 9/2020 | Fujii .................. B60C 23/0416 |

FOREIGN PATENT DOCUMENTS

| | | |
|---|---|---|
| EP | 0895879 A2 | 2/1999 |
| EP | 3366499 A1 | 8/2018 |
| WO | 2008156447 A1 | 12/2008 |

OTHER PUBLICATIONS

European Office Action from corresponding European Application No. 19 176 319.2-1012, dated Jul. 12, 2022.

* cited by examiner

AUTO-LOCATION USING TIRE MOUNTED SYSTEM

FIELD OF THE INVENTION

The invention relates to the field of sensor devices mounted in a tire of a vehicle. More specifically it relates to systems and methods for auto-locating on which position a wheel is mounted on the vehicle.

BACKGROUND OF THE INVENTION

Auto-location is the ability of the electronic control unit (ECU) of a car to identify which wheel is sending wireless messages through its embedded tire pressure monitoring system (TPMS). To do so, the ECU of the car correlates phase angle information sent from the TPMS module with position information obtained from the ABS (anti-lock braking system).

Prior art auto-location systems usually need complex and high power consuming algorithms for retrieving angular information of the wheel.

A typical way of performing auto-location is to measure the gravitational force component (+/−1 g) with an accelerometer. This measurement allows the phase angle of the wheel to be calculated. In such systems, typically an RF message is sent at a predefined angle with a unique identifier of the wheel. The car ECU then correlates the information from each wheel with their respective positions obtained through others sensors (e.g. ABS). This method has two major drawbacks, mainly because the +/−1 g signal is quite noisy:

it requires the signal to be acquired over several rotations (e.g. between 4 and 7 rotations) and filtered in order to precisely identify the phase angle and trigger the RF message. This leads to a relatively high power consumption.

even after filtering the precision of the time at which the RF signal is sent is limited due to the intrinsic properties of the low gravitational acceleration sensed signal.

The basic principle of auto-location is described in U.S. Pat. No. 9,387,733B2.

US20180244116A1 discloses a method of obtaining phase angle information from the data of an accelerometer. In this application advanced signal processing is required to exact the phase angle information from +/−1 g signals. FIG. 1 shows a graph from this patent application. A plurality of "dots" are shown as an example of actual acceleration data versus time, obtained from an acceleration sensor mounted to a wheel, including noise, mainly caused by mechanical vibrations. FIG. 1 also shows a "sinusoidal curve" as can be obtained for example by "curve fitting" techniques performed on a powerful computer. Instead of calculating this curve, in US20180244116A1 an exponential moving average filter is applied to the acceleration data in order to obtain phase angle information from the accelerometer.

U.S. Pat. No. 8,332,103B2 shows an example where the RF signal is sent at two angles with a predetermined time period between two angle measurements. The elapsed time between two angle measurements can be equivalent to several rotations of the wheel. This leads to high power consumption.

There is therefore a need for good solutions for auto-location systems and methods in view of the power consumption of these systems and methods.

SUMMARY OF THE INVENTION

It is an object of embodiments of the present invention to provide a good system and method for auto-locating on which position a wheel is mounted on a vehicle.

The above objective is accomplished by a method and device according to the present invention.

In a first aspect embodiments of the present invention relate to an auto-location system for auto-locating a wheel in a vehicle. The auto-location system comprises:

a sensor module which comprises a sensor adapted for sensing a physical property of the tire when mounted in a tire or on an inner surface of the tire of the wheel, an acquisition system adapted for determining when the part of the tire where the sensor is mounted hits the ground, and forms a contact patch with the ground, by analyzing data from the sensor, and a communication system adapted for transmitting a wireless message, in which a unique identifier is embedded, a transmit delay after the part of the tire where the sensor is mounted hits the ground.

It is an advantage of embodiments of the present invention that the data of only a fraction of the wheel rotation period is required to determine when the part of the tire where the sensor is mounted hits the ground. This moment is sufficient for determining the installation position of the wheel by correlating it with rotation angle information associated with the different tires of the vehicle.

It is an advantage of embodiments of the present invention that, for the auto-location, the sensor module only needs to determine when the part of the tire where the sensor is mounted hits the ground. Thus, the signal processing can be reduced leading to a reduced power consumption of the sensor module. Hence, the battery lifetime of the sensor module can be increased.

It is an advantage of embodiments of the present invention that a better phase angle resolution can be obtained than with a prior art sensor system.

In embodiments of the present invention the sensor is mounted in a tire or on an inner surface of the tire of the wheel. The sensor can for example be completely integrated in the tire (over-molded), or partially over molded, or attached/glued on the inner surface.

In embodiments of the present invention the acquisition system is adapted for determining when the part of the tire where the sensor is mounted hits the ground by comparing data from the sensor with at least one characterizing feature of a perturbation in the data which is induced by the contact patch.

In embodiments of the present invention the sensor module comprises a circular buffer for storing data from the sensor.

The size of the circular buffer may thereby be limited to a size which is sufficient to store the data of a perturbation including the transmit delay.

In embodiments of the present invention the transmit delay of the sensor module is equal to zero.

In embodiments of the present invention the sensor is an acceleration sensor.

In embodiments of the present invention the sensor module is adapted for performing an acquisition cycle of waking up, triggering the acquisition system to acquire the data of at least one perturbation in the data of the sensor, wherein the perturbation is induced when the part of the tire where the sensor is mounted hits the ground, transmitting the wireless message, and going to a reduced power state.

In embodiments of the present invention the auto-location system is adapted for having a predefined period between consecutive acquisition cycles.

In embodiments of the present invention the auto-location system comprises a control unit adapted for receiving one or more wireless messages and for correlating the one or more wireless messages with rotation angle information, associated with the different tires of the vehicle, to determine the installation position of the tire where the sensor module with the unique identifier is installed.

In embodiments of the present invention the control unit is adapted for receiving rotation angle information from the different tires of the vehicle.

In a second aspect embodiments of the present invention relate to a method for auto-locating a wheel in a vehicle using a sensor module which comprises a sensor mounted in a tire or on an inner surface of the tire of the wheel, the sensor being adapted for sensing a physical property of the tire. The method comprises:
- acquiring data from the sensor and storing the data,
- determining when the part of the tire where the sensor is mounted hits the ground, and forms a contact patch with the ground, by analyzing data from the sensor,
- transmitting a wireless message, in which a unique identifier is embedded, a transmit delay after the part of the tire where the sensor is mounted hits the ground.

In embodiments of the present invention a duration of the contact patch is embedded in the wireless message.

In embodiments of the present invention the transmit delay is embedded in the wireless message.

It is an advantage of embodiments of the present invention that the moment when the sensor was located at the center of the contact patch can be determined from the arrival moment of the wireless message, the duration of the contact patch, and the transmit delay.

In embodiments of the present invention the wireless message may comprise the elapsed time between the detection of the center of the contact patch and the transmission of the wireless message.

In embodiments of the present invention determining when the part of the tire where the sensor is mounted hits the ground is done by comparing the sensor data with at least one characterizing feature of a perturbation in the data induced when the part of the tire where the sensor is mounted hits the ground.

In embodiments of the present invention the predefined features comprise leading edge and trailing edge conditions.

In embodiments of the present invention the sensor data is stored in a circular buffer.

In embodiments of the present invention the method comprises correlating one or more wireless messages with rotation angle information, associated with the different tires of the vehicle, to determine the installation position of the tire in which the sensor module with the unique identifier is installed.

In embodiments of the present invention a period between consecutive contact patches, when the part of the tire where the sensor is mounted hits the ground, is embedded in the wireless message.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1:
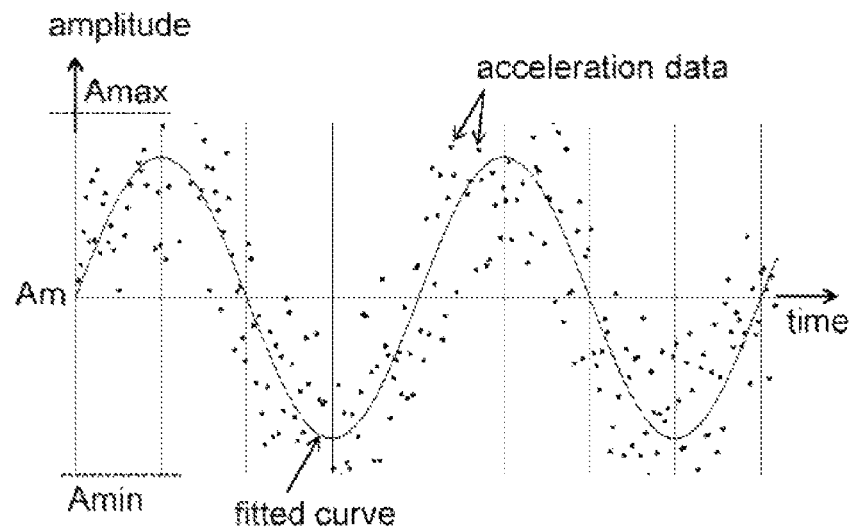
FIG. 1 shows a prior art graph of acceleration data in function of time obtained from an acceleration sensor mounted to a wheel, including noise, mainly caused by mechanical vibrations.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Figure 4:
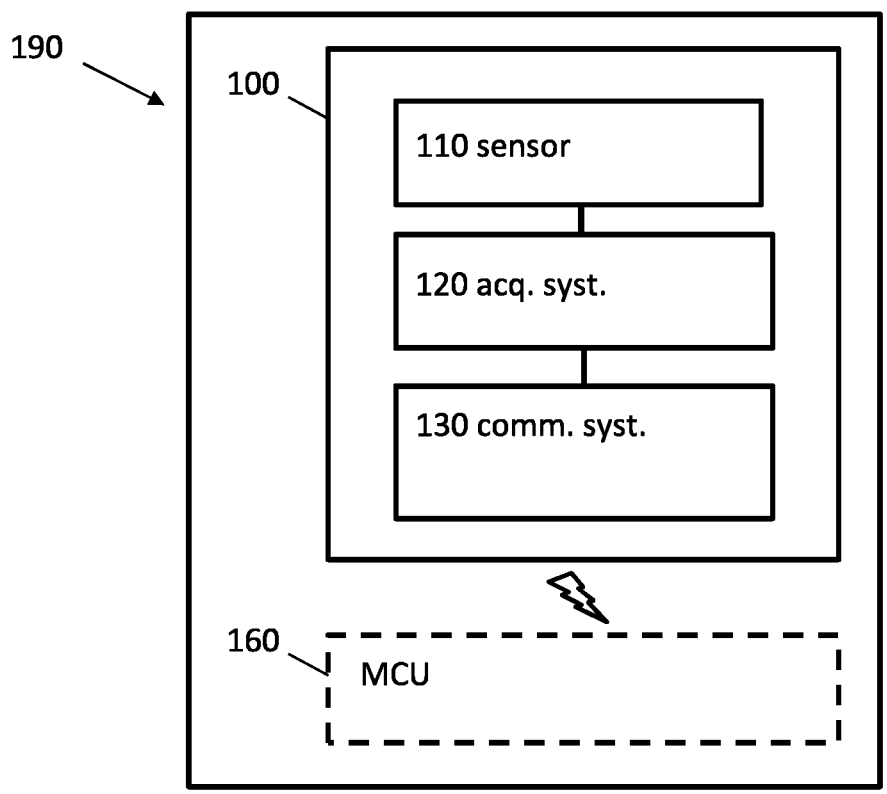
FIG. 4 shows a block diagram of an exemplary auto-location system in accordance with embodiments of the present invention.

In a first aspect embodiments of the present invention relate to an auto-location system 190 for auto-locating a wheel in a vehicle. FIG. 4 shows a block diagram of an exemplary auto-location system 190 in accordance with embodiments of the present invention. The auto-location system 190 comprises a sensor module 100. The sensor module 100 comprises:

a sensor 110 adapted for sensing a physical property of the tire when mounted in a tire or on an inner surface of the tire of the wheel, an acquisition system 120 adapted for determining when the part of the tire where the sensor 110 is mounted hits the ground, and forms a contact patch with the ground, by analyzing data from the sensor 110, and a communication system 130 adapted for transmitting a wireless message, in which a unique identifier is embedded, a transmit delay after the part of the tire where the sensor is mounted hits the ground.

In embodiments of the present invention the auto-location system 190 moreover may comprise a control unit 160 adapted for receiving one or more wireless messages and for correlating the one or more wireless messages with rotation angle information, associated with the different tires of the vehicle, to determine the installation position of the tire where the sensor module with the unique identifier is installed.

In embodiments of the present invention the control unit 190 is adapted for receiving rotation angle information from the different wheels. The rotation angle information may for example be obtained from an ABS system or any other system which allows to determine the rotation angle at a certain moment in time for the different wheels. The information may be received by the control system via a control network (e.g. a CAN bus).

It is an advantage of embodiments of the present invention that a single contact patch (which represents a fraction of a wheel rotation) can be used to trigger the sensor module to transmit the wireless message wirelessly. It is thereby advantageous that no additional complex operation is required from the sensor module.

The data may be continuously acquired from the sensor. The acquired data may for example be stored in a loop table (also referred to as a circular buffer). In embodiments of the present invention the size of the circular buffer may be selected such that it is minimally the size of the data of the perturbation plus the size of the data collected during the transmit delay. In some embodiments it may be equal to this size. In case of a circular buffer, this buffer may for example achieved by filling a loop table until the end of the table, after which the loop table is filled from the beginning. In general a circular buffer may be achieved by filling the buffer until it is full and from then onwards by overwriting the oldest sample with the newest sample. This is done continuously until a perturbation in the data, which is caused by a contact patch, is detected in the loop table (e.g. until the leading and trailing edge are detected in the data, or until a peak is detected in the data, or any other characterising feature of the perturbations).

The sensor may for example be an acceleration sensor, an ultrasonic sensor, a piezoelectric sensor, an optical sensor, a magnetic sensor, a deformation sensor, or a shock sensor. Different sensors may be combined. A physical property of the tire may for example be a dynamic property. For example the perturbation may be measured using an acceleration sensor.

When such a sensor module 100 is mounted in a tire or on an inner surface of the tire, it will rotate together with the tire. The contact between the tire and the ground results in a deformation of the tire. This deformation results in an additional change of the physical property of the tire which is measured by the sensor 110. Hence, a perturbation will be present in the data from the sensor. This perturbation is induced by the contact patch nearby the sensor. Acquiring the sensor data during this contact patch period is also referred to as contact patch acquisition.

In embodiments of the present invention the acquisition of the data may be performed using an analog to digital converter (ADC). This ADC converts an analog signal from the sensor into digitized data. The acquisition system samples the data from the analog to digital converter and stores it in the buffer.

In embodiments of the present invention determining when the part of the tire where the sensor is mounted hits the ground is done by comparing the sensor data with at least one characterizing feature of a perturbation in the data induced by the contact patch. This at least one characterizing feature is depending on the type of sensor. The sensor may for example be an acceleration sensor. The acceleration sensor may be sensitive to radial acceleration and/or to tangential acceleration.

Figure 2:
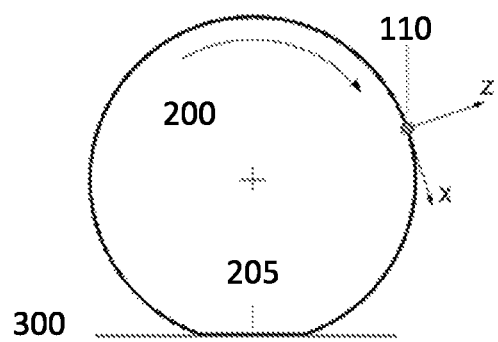
FIG. 2 shows a schematic drawing of a tire in which a sensor is mounted in accordance with embodiments of the present invention.
Figure 5:
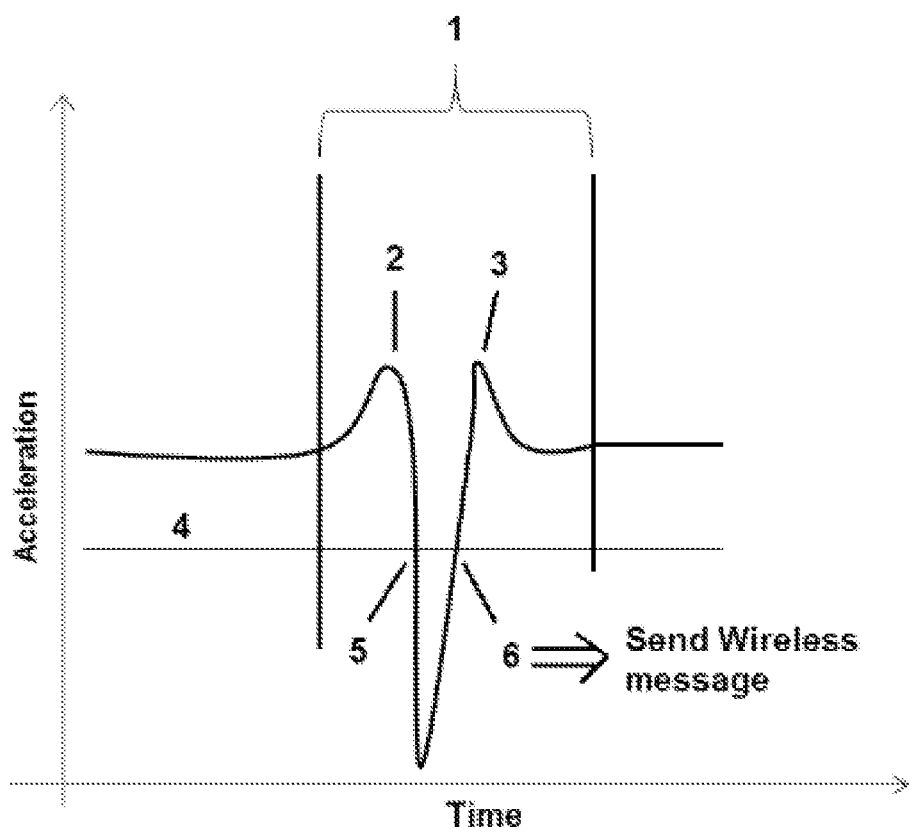
FIG. 5 shows a diagram of a contact patch induced perturbation in function of time in accordance with embodiment of the present invention.

An example of such a perturbation is shown in FIG. 5. It shows the perturbation generated by an acceleration sensor which is adapted for measuring the radial acceleration (i.e.

acceleration along the Z-axis in FIG. 2). The amplitude of the perturbation is shown in function of time. The perturbation has a falling edge (leading edge 2) from a first maximum to a minimum and a rising edge (trailing edge 3) from the minimum to a second maximum. The patch duration is a measure for the duration of the perturbation. The patch duration ($t_{patch}$) may for example be defined as the duration between the first maximum and the second maximum. The threshold 4 which is crossed by the amplitude of the perturbation and not by the other data of the acceleration sensor may be used as characterizing feature of the pulse. The moment when the leading edge 2 crosses the threshold 4 is indicated by reference number 5. The moment when the trailing edge 3 crosses the threshold 4 is indicated by reference number 6. The patch duration ($t_{patch}$) may also be defined as the elapsed time between the moment 5 when the leading edge 2 crosses the threshold 4 and the moment 6 when the trailing edge 3 crosses the threshold 4. Directly, after this moment 6 the wireless message is wirelessly transmitted. The useful information is mainly present in the perturbation. In embodiments of the present invention the wireless message may for example comprise a unique identifier of the sensor module and a measure of the patch duration (e.g. $t_{patch}/2$). In embodiments of the present invention the sensor module may go to sleep mode after transmitting the wireless message.

Other characterizing features of the perturbation may be used for determining when the part of the tire where the sensor is mounted hits the ground. Examples thereof are characteristics of the leading edge and the trailing edge such as the slope.

In embodiments of the present invention comparing the stored data with at least one characterizing feature of the perturbation may comprise processing the data. The processing may for example comprise performing a Fast Fourier Transform (FFT) on the data. The at least one characterizing features of the perturbation is in that case a characterizing feature of the processed data (for example an edge or a peak in the processed data).

Figure 6:
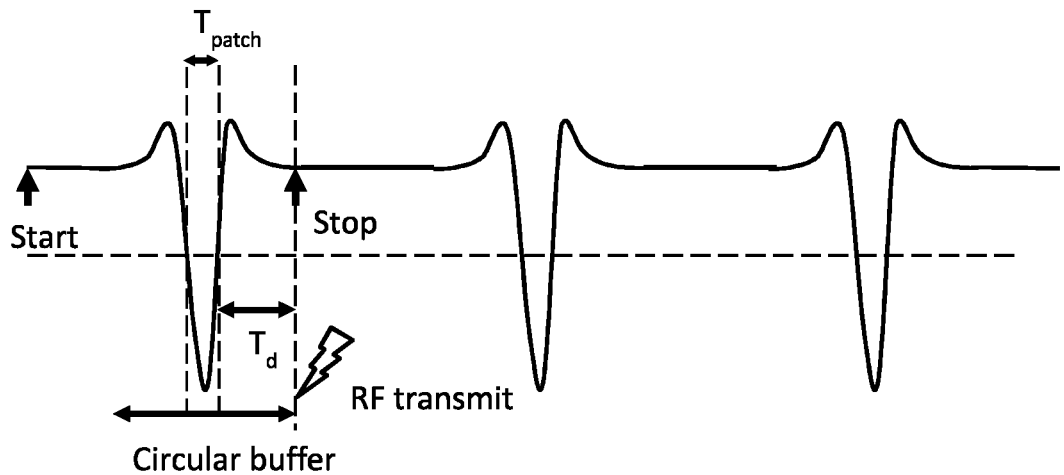
FIG. 6 shows a diagram of a contact patch induced perturbation sequence in function of time in accordance with embodiments of the present invention.

In FIG. 5 the wireless message is transmitted directly after the perturbation is determined. This is not necessarily the case. In some embodiments of the present invention the wireless message may be transmitted a transmit delay after the perturbation is determined. An example thereof is illustrated in FIG. 6. FIG. 6 shows a diagram of a contact patch induced perturbation sequence in function of time. At the start moment the sensor system wakes up and triggers the acquisition system to acquire data from the sensor. In this example the sensor is an acceleration sensor. The invention is, however, not limited thereto. The start of acquisition is indicated by the first vertical dashed line. In this exemplary embodiment of the present invention, the buffering is stopped a transmit delay ($T_d$) after the perturbation in the data is recognized. This moment is indicated by the second vertical dashed line. In this example the transmit delay starts from the moment the trailing edge of the perturbation crosses the trailing edge threshold. The data between the dashed lines may for example be stored in a circular buffer. After the transmit delay the wireless message is transmitted. An advantage of waiting the transmit delay is that the full contact patch data is stored in the buffer and further signal processing can be performed in order to improve the precision on the determination of the patch period ($T_{patch}$). In turn, this improves the phase angle determination at the control unit (e.g. ECU).

In embodiments of the present invention the buffering may be stopped immediately after the perturbation is recognized.

In embodiments of the present invention the wireless message may be delayed by a transmit delay before it is transmitted. This can for instance be used to send the wireless message at a different angle, e.g. 90° or 180°, relative to the angle at which the sensor hits the ground, so that the wireless transmitter is closer to the receiver. The angle may be selected such that the distance between the wireless transmitter and the receiver is minimal. Assuming, for example, that the RF receiver is located in the car near the dashboard—then the sensor is relatively far from the receiver if it sends the RF message immediately when it hits the ground (lower position). Therefore the signal is weaker and/or more RF power is needed. By adding a delay $T_d$ after the sensor hits the ground (lower position), thereby waiting until the wheel rotates to a position that the sensor is closer to the receiver, it is possible to reduce the required RF power. In this case the transmit delay $T_d$ is adapted as a function of the speed of the vehicle. In alternative embodiments of the transmit delay may be a predefined delay. The delay $T_d$ can be embedded in the message so that the control unit can trace back the exact moment when the sensor hit the ground.

Figure 7:
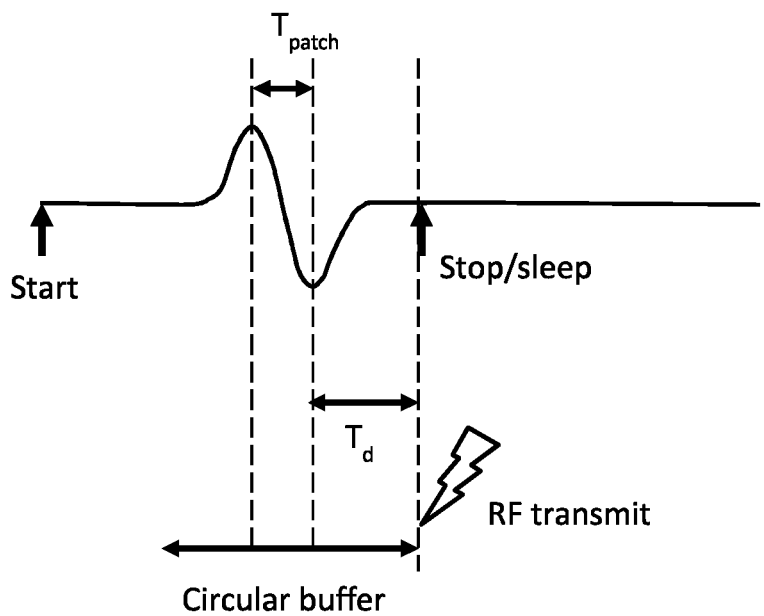
FIG. 7 shows a diagram of a contact patch induced perturbation generated by an acceleration sensor which is sensitive to tangential acceleration wherein the perturbation is recognized by means of peak detection in accordance with embodiments of the present invention.

FIG. 7 shows a diagram of a contact patch induced perturbation generated by an acceleration sensor which is sensitive to tangential acceleration wherein the perturbation is recognized by means of peak detection. The tangential acceleration corresponds with the acceleration along the x-axis in FIG. 2. In this exemplary embodiment the perturbation is recognized by detecting the second peak. The characterizing feature may for example be a threshold for determining the second peak or an expected shape of the second peak which can be correlated with the measured data, or any other kind of peak detection. In embodiments of the present invention the perturbation may be recognized by detecting the first peak and the second peak. In that case the characterizing features relate to the first peak and the second peak. A transmit delay ($T_d$) after the perturbation is recognized, the wireless message is transmitted and the sensor module 100 goes to sleep mode. The duration of the patch period, between the maximum and the minimum of the tangential acceleration, is indicated by $T_{patch}$.

Sensor modules 100 according to embodiments of the present invention may for example be integrated in a TMS (tire monitoring system) or TPMS (tire pressure monitoring system) module.

To improve the resolution of the measurement, the information of the contact patch duration can be optionally transmitted in the wireless message along with the unique identifier of the wheel. The ECU 160 of the car can then use this information to precisely determine when the sensor (e.g. accelerometer) was located at the center of the contact patch. In this case the patch duration may for example be obtained by measuring the duration between the two peaks.

In embodiments of the present invention the sensor system 100 is adapted for going into low power mode in between perturbation acquisitions. In such sensor systems 100 the sensor system wakes up and triggers the acquisition system to acquire the data from the sensor. In embodiments of the present invention the sensor module may typically be adapted for waking up, detecting the contact patch features (e.g. leading/trailing edge), transmitting the wireless message (e.g. via RF or BLE) with the unique identifier (and optionally contact patch duration) indicative of wheel phase angle, and getting back to sleep (thereby obtaining a reduced power consumption). The period between consecutive acquisition cycles may be a predefined period or it may depend on the wheel speed. The sensor module may for example go to sleep for 10-20 seconds.

In a second aspect embodiments of the present invention relate to a method 400 for auto-locating a wheel in a vehicle using a sensor module which comprises a sensor mounted in a tire or on an inner surface of the tire of the wheel, the sensor being adapted for sensing a physical property of the tire.

The method 400 comprises:
acquiring 410 data from the sensor and storing the data,
determining 420 when the part of the tire where the sensor is mounted hits the ground and forms a contact patch with the ground, by analyzing data from the sensor,
transmitting 430 a wireless message, in which a unique identifier is embedded, a transmit delay after the part of the tire where the sensor is mounted hits the ground.

Figure 3:
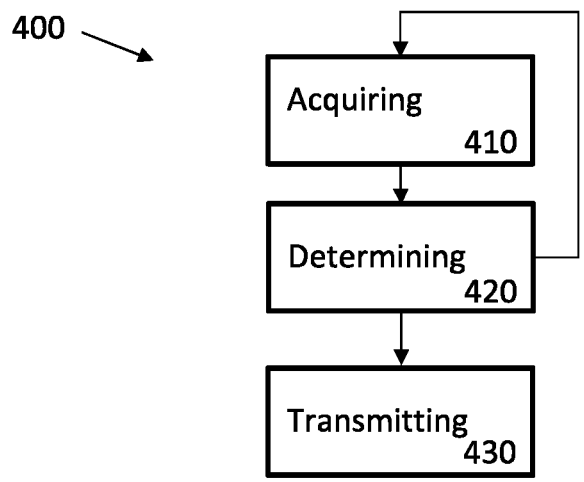
FIG. 3 shows an exemplary flow chart of a method in accordance with embodiments of the present invention.

In embodiments of the present invention the method may moreover comprise correlating one or more wireless messages with rotation angle information associated with the different tires of the vehicle to determine the installation position of the tire in which the sensor module with the unique identifier is installed. An exemplary flow chart of such a method in accordance with embodiments of the present invention is illustrated in FIG. 3.

An example of a tire 200 in which a sensor 110 is mounted is schematically illustrated in FIG. 2. The sensor is mounted at a certain position of the tire 200. The time period during which this position is part of the contact patch 205 between the tire 200 and the road surface 300 a perturbation will occur in the signal generated by the tire mounted sensor.

The method is based on patch area detection of a tire (i.e. determining 420 when the part of the tire where the sensor is mounted hits the ground and forms a contact patch with the ground). In embodiments of the present invention this is done by analyzing data from the sensor which is mounted in the tire or on an inner surface of the tire. When the part of the tire where the sensor is mounted hits the ground and forms a contact patch, this will induce a perturbation in the sensor data. Determining when the part of the tire where the sensor is mounted hits the ground and forms a contact patch with the ground, may be done by comparing the data with at least one characterizing feature of the perturbation.

The perturbation may for example correspond with a pulse comprising firstly a leading and secondly a trailing edge. Determining when the part of the tire where the sensor is mounted hits the ground and forms a contact patch with the ground by comparing the data with at least one characterizing feature of the perturbation, is in this case done by detection of the leading and the trailing edge of the pulse.

After determining when the part of the tire where the sensor is mounted hits the ground (e.g. when the trailing edge has been detected), a wireless message (e.g. RF or Bluetooth low energy (BLE) or ultra high frequency (UHF)) containing the unique identifier of the sensor module is transmitted 430 by the sensor module. This wireless message may be transmitted a transmit delay after the part of the tire where the sensor is mounted hits the ground.

This wireless message may optionally comprise other parameters, such as the temperature, the pressure, the battery voltage of the sensor battery. The duration of the contact patch may also be embedded in the wireless message. When the perturbation in the data, caused by the contact patch, is a pulse, the duration of the contact patch may be estimated as the time event of the trailing edge minus the time event of the leading edge.

The transmitted wireless message is received by a control unit (e.g. an electronic control unit ECU), which is adapted for correlating one or more wireless messages with rotation angle information, associated with the different tires of the vehicle, to determine the installation position of the tire in which the sensor module with the unique identifier is installed. By transmitting the wireless message, the control unit knows exactly when the part of the tire where the sensor module is located has hit the road. In embodiments of the present invention the trigger events (the one or more contact messages) are statistically correlated with rotation angle information.

By transmitting the contact patch duration, the control unit (e.g. ECU) can trace back when the center of the perturbation occurred. At different speeds, the contact patch has a different duration (i.e. shorter at higher speed). Therefore, if the trailing edge is used to trigger the RF message, this would introduce an angle error (RF message triggered with a delay at lower speeds). However, the patch duration information or half of the patch duration ($T_{patch}/2$) patch, allows the control unit to know precisely when the center of the contact patch occurred. Even if the RF message is sent at a different phase angle because of speed variation, then the control unit can know when the center of the contact patch occurred as long a $T_{patch}$ or $T_{patch}/2$ or any other variable from which the patch duration can be derived, is encoded in the message. Therefore, in embodiments of the present invention, a phase angle can be computed by the control unit, which is independent of the vehicle speed."

The invention claimed is:

1. An auto-location system for auto-locating a wheel in a vehicle, the auto-location system comprises:
   a sensor module which comprises a sensor adapted for sensing a physical property of the tire when mounted in a tire or on an inner surface of the tire of the wheel;
   an acquisition system adapted for determining when the part of the tire where the sensor is mounted hits the ground, and forms a contact patch with the ground, by analyzing data from the sensor; and
   a communication system adapted for transmitting a wireless message, in which a unique identifier is embedded, a transmit delay after the part of the tire where the sensor is mounted hits the ground,
   wherein a duration of the contact patch and/or the transmit delay is embedded in the wireless message.

2. The auto-location system according to claim 1, wherein the acquisition system is adapted for determining when the part of the tire where the sensor is mounted hits the ground by comparing data from the sensor with at least one characterizing feature of a perturbation in the data which is induced by the contact patch.

3. The auto-location system according to claim 1, the sensor module comprising a circular buffer for storing data from the sensor.

4. The auto-location system according to claim 1, wherein the transmit delay of the sensor module is equal to zero.

5. An auto-location system according to claim 1, wherein the sensor is an acceleration sensor.

6. The auto-location system according to claim 1, wherein the sensor module is adapted for performing an acquisition cycle of:
   waking up;
   triggering the acquisition system to acquire the data of at least one perturbation in the data of the sensor, wherein the perturbation is induced when the part of the tire where the sensor is mounted hits the ground;
   transmitting the wireless message; and
   going to a reduced power state.

7. The auto-location system according to claim 6, adapted for having a predefined period between consecutive acquisition cycles.

8. The auto-location system according to claim 1, the auto-location system comprising a control unit adapted for receiving one or more wireless messages and for correlating the one or more wireless messages with rotation angle information, associated with the different tires of the vehicle, to determine the installation position of the tire where the sensor module with the unique identifier is installed.

9. A method for auto-locating a wheel in a vehicle using a sensor module which comprises a sensor mounted in a tire or on an inner surface of the tire of the wheel, the sensor being adapted for sensing a physical property of the tire, the method comprising:
    acquiring data from the sensor and storing the data;
    determining when the part of the tire where the sensor is mounted hits the ground, and forms a contact patch with the ground, by analyzing data from the sensor; and
    transmitting a wireless message, in which a unique identifier is embedded, a transmit delay after the part of the tire where the sensor is mounted hits the ground,
    wherein a duration of the contact patch and/or the transmit delay is embedded in the wireless message.

10. A method for auto-locating a wheel in a vehicle using a sensor module which comprises a sensor mounted in a tire or on an inner surface of the tire of the wheel, the sensor being adapted for sensing a physical property of the tire, the method comprising:
    acquiring data from the sensor and storing the data;
    determining when the part of the tire where the sensor is mounted hits the ground, and forms a contact patch with the ground, by analyzing data from the sensor; and
    transmitting a wireless message, in which a unique identifier is embedded, a transmit delay after the part of the tire where the sensor is mounted hits the ground,
    wherein determining when the part of the tire where the sensor is mounted hits the ground is done by comparing the sensor data with at least one characterizing feature of a perturbation in the data induced when the part of the tire where the sensor is mounted hits the ground and wherein the predefined features comprise leading edge and trailing edge conditions.

11. The method according to claim 9, wherein the sensor data is stored in a circular buffer.

12. The method according to claim 9, the method comprising correlating one or more wireless messages with rotation angle information, associated with the different tires of the vehicle, to determine the installation position of the tire in which the sensor module with the unique identifier is installed.

13. An auto-location system for auto-locating a wheel in a vehicle, the auto-location system comprises:
    a sensor module which comprises a sensor adapted for sensing a physical property of the tire when mounted in a tire or on an inner surface of the tire of the wheel;
    an acquisition system adapted for determining when the part of the tire where the sensor is mounted hits the ground, and forms a contact patch with the ground, by analyzing data from the sensor; and
    a communication system adapted for transmitting a wireless message, in which a unique identifier is embedded, a transmit delay after the part of the tire where the sensor is mounted hits the ground,
    wherein determining when the part of the tire where the sensor is mounted hits the ground is done by comparing the sensor data with at least one characterizing feature of a perturbation in the data induced when the part of the tire where the sensor is mounted hits the ground and wherein the predefined features comprise leading edge and trailing edge conditions.

\* \* \* \* \*